United States Patent [19]

Tzschoppe et al.

[11] 4,077,135

[45] Mar. 7, 1978

[54] APPARATUS FOR THE MANUFACTURE OF VINYL CHLORIDE POLYMERS

[75] Inventors: Eberhard Tzschoppe; Jürgen Weinlich, both of Burgkirchen, Alz, Germany

[73] Assignee: Hoechst Aktiengesellschaft, Frankfurt am Main, Germany

[21] Appl. No.: 664,889

[22] Filed: Mar. 8, 1976

[30] Foreign Application Priority Data

Mar. 7, 1975 Germany .............................. 2509937

[51] Int. Cl.² ............................................. F26B 17/00
[52] U.S. Cl. .................................. 34/57 R; 34/57 D; 34/60
[58] Field of Search ................ 34/57 R, 57 D, 59, 60, 34/217

[56] References Cited

U.S. PATENT DOCUMENTS

| 547,597 | 10/1895 | Brantingham | 34/59 X |
| 1,590,798 | 6/1926 | Barker | 34/59 |
| 2,817,155 | 12/1957 | Gilliam et al. | 34/59 |
| 3,190,867 | 6/1965 | Oldweiler et al. | 34/57 R |
| 3,793,742 | 2/1974 | Rainville et al. | 34/57 R |

Primary Examiner—John J. Camby
Attorney, Agent, or Firm—Connolly and Hutz

[57] ABSTRACT

The present invention provides vinyl chloride polymers having a reduced content of residual monomer. They are obtained by treating with steam a product moist with water at a temperature of from 90° to 125° C under a pressure of from 400 to 1,600 mm Hg. The invention also provides an apparatus to carry out the steam treatment of the moist polymer. The treated polymers have a residual vinyl chloride content down to less than 0.001% by weight.

11 Claims, 8 Drawing Figures

APPARATUS FOR THE MANUFACTURE OF VINYL CHLORIDE POLYMERS

This invention relates to a process and apparatus for producing in aqueous suspension vinyl chloride homopolymers, graft polymers and copolymers having a very low content of monomeric vinyl chloride.

Recent investigations have revealed that monomeric vinyl chloride may have a detrimental physiological effect and, therefore, it has become desirable to produce polymers from the said monomer having a considerably lower content of monomeric vinyl chloride (VC) then hitherto usual.

In the known industrial manufacturing processes for vinyl chloride homopolymers and copolymers low contents of residual VC monomer, for example below 0.01% by weight, cannot be reached, or they are reached only if, in the working up of the very fine grained polymer types to the dry polymer, residual monomeric vinyl chloride is blown into the atmosphere in amounts which, in the future, will have to be avoided almost certainly for reasons of environmental protection.

Various processes have been proposed to reduce the content of residual monomer in polymer dispersions. In general, the monomer is removed by pressure release of the polymerization mixture. The residual monomer can also be eliminated by blowing steam or inert gases into the polymer dispersion. For this purpose considerable amounts of steam or gas are required, which cause difficulties, particularly with polymer dispersions which tend to foam. These difficulties require additional apparatus and, in part, the processes applied are liable to trouble.

It has also been proposed to treat polymer dispersions with steam or inert gases in a column. This process also necessitates much expenditure pertaining to apparatus and deposits from the dispersion may cause obstructions.

According to another known process the dry vinyl chloride polymer is heated to a temperature in the range of from the second order transition temperature to 180° C by directly condensing steam thereon and the polymer is maintained at said temperature for a sufficient period of time to remove the major proportion of the monomer(s) contained in the polymer, whereupon the polymer is cooled to a temperature below its second order transition point by evaporation of the steam condensed thereon. During heating and cooling of the polymer the temperature is controlled by regulating the pressure. After the treatment the polymer can be directly stored and processed without intermediate drying.

The latter process has a more favorable steam consumption than the former ones but considerable regulating apparatus and pressure resistant vessels are required.

Accordingly, it is the object of this invention to provide a process which does not have the aforesaid disadvantages and permits a more rapid and more complete removal of monomeric vinyl chloride at short treatment times and with small steam consumption.

The object of this invention is achieved by a process for the manufacture of vinyl chloride polymers with reduced monomer content and containing at least 75% by weight, preferably at least 85% by weight, calculated on the total polymer, of vinyl chloride units, which polymers have been obtained by polymerization in aqueous suspension with separation of the main quantity of the aqueous medium, which comprises treating with steam a vinyl chloride polymer having a water content in the range of from about 5 to 35% by weight, calculated on solid matter, at a temperature of from 90° to 125° C and under a pressure of 400 to 1,600 mm Hg and subsequently drying the polymer.

The main quantity of the aqueous medium is preferably separated by known methods in a decanter, a centrifuge or a suction filter. The temperature of the polymerization mixture should be as high as possible in order to save energy in the subsequent steam treatment for heating the product. The liquid medium should be separated to an extent such that the remaining polymer has residual water content of about 5 to 35% by weight, preferably 15 to 30% by weight, calculated on solid matter. It proved particularly advantageous to subject to the steam treatment a polymer having a water content of from 20 to 28% by weight since such a product can be obtained with short decanting periods and with relatively small heat losses. On principle, vinyl chloride polymers the water content of which is outside the aforesaid range could be used in the process of the invention, although in this case certain disadvantages may arise.

After separation of the aqueous medium the water-containing polymer must generally be slightly heated in order to reach the treating temperature of the invention. The required heat can be supplied by heated reactor walls and/or by passing through heated inert gases. It is advantageous to use steam heated to about 105° to 160° C, optionally combined with a heat supply through the reactor wall as this steam could be used for the further treatment. In this preferred embodiment of the invention the condensation of water in the moist product is avoided. In this manner energy is saved in the later drying of the polymer and with too high a water content of the polymer a slurry like consistency and, hence, poor processing properties could be avoided.

When a temperature of about 90° C is reached the moist polymer is treated with steam. During the treatment the polymer temperature should not exceed about 125° C, since above said temperature the product may agglomerate and thermal degradation commences. At a temperature below about 90° C the demonomerization is relatively slow which entails disadvantages. The steam treatment is preferably carried out at a polymer temperature of 98° to 115° C. In general, after having reached a temperature of about 90° C, a treatment of 2 to 30 minutes, mostly 2 to 20 minutes is sufficient. The time limits are not very sharp and primarily depend on the desired content of residual monomer. The polymer is preferably treated with steam for a period of 3 to 15 and more preferably 5 to 10 minutes.

During the treatment an as uniform as possible and substantial contact of the steam with the polymer must be ensured. The polymer can be subjected to the action of steam for example in the form of a thin layer being kept in motion, for example by stirring, shaking, shoveling, or whirling up. Especially good results are obtained when thick polymer layers are treated with steam in the device according to the invention described below.

The steam may be admixed with up to 90% by volume, preferably up to 60% by volume, calculated on the total gas volume, of optionally heated inert gases, for example air, nitrogen or carbon dioxide.

The monomeric vinyl chloride, and possible other monomers, removed together with the steam or mixture of steam and inert gas is or are suitably recovered, for example by condensation or adsorption with subsequent desorption, and recycled into the polymerization process.

The steam treatment is preferably carried out under a pressure of from 400 to 1,600 mm Hg, although, on principle, lower or higher pressures are likewise possible. The treatment is advantageously carried out at an approximately constant pressure and temperature, a treatment at normal atmospheric pressure being particularly advantageous with regard to apparatus.

After the steam treatment the moist polymer is suitably dried in a heated inert gas current, for example air, nitrogen or carbon dioxide, optionally under reduced pressure. Drying can be carried out, at least partially, in the same apparatus in which the steam treatment has been performed. Other known methods are also suitable, for example drying in pneumatic conveying driers or rotary driers. To save energy, it is advantageous to dry the moist polymer directly after the steam treatment without substantial intermediate cooling. To achieve a good drying effect an amount of heat sufficient to maintain the temperature of the polymer at or above the second order transition temperature should be supplied by the inert gas used for drying and/or through the reactor wall.

The vinyl chloride homo-, graft- or copolymer to be treated according to the present invention can be prepared by continuous or discontinuous polymerization processes with or without the use of a seedy polymer. The polymers are prepared in aqueous suspension in the presence of from 0.001 to 3% by weight, preferably from 0.01 to 0.3% by weight, calculated on the monomers, of at least one radical forming oil-soluble catalyst, for example diaryl and diacyl peroxides such as diacetyl, acetyl-benzoyl, dilauroyl, dibenzoyl, bis-2,4-dichlorobenzoyl and bis-2-methyl-benzoyl peroxides; dialkyl peroxides such as di-tert.butyl peroxide; peresters such as tert.butyl percarbonate, tert.butyl peracetate, tert.butyl peroctoate and tert.butyl perpivalate; dialkyl peroxy dicarbonates such as diisopropyl, diethyl-hexyl, dicyclohexyl and diethylcyclohexyl peroxy dicarbonates; mixed anhydrides of organic sulfoperacids and organic acids such as acetylcyclohexyl-sulfonyl peroxide; and azo compounds used as polymerization catalysts such as azoisobutyronitrile; and optionally in the presence of water-soluble catalysts, for example potassium, sodium and ammonium persulfates; hydrogen peroxide, tert.butyl hydroperoxide and other water soluble peroxides.

The peroxidic catalysts can also be used in the presence of from 0.01 to 1% by weight, calculated on the monomers, of at least one reducing substance suitable for the synthesis of a redox catalyst system, for example sulfites, bisulfites, dithionites, thiosulfates, and aldehyde sulfoxylates, for example formaldehyde sulfoxylate. The polymerization can also be carried out in the presence of soluble metal salts, for example of copper, silver or iron, in amounts of from 0.05 to 10 ppm, calculated as metal on the monomer(s).

The polymerization can also be carried out in the presence of from 0.01 to 1% by weight, preferably from 0.05 to 0.3% by weight, calculated on the monomers, of at least one of the usual protective colloids, for example polyvinyl alcohols which may contain up to 40 mol % of acetyl groups; cellulose derivatives such as water-soluble methyl cellulose, carboxymethyl cellulose and hydroxyethyl cellulose; gelatin; copolymers of maleic acid or the semi-esters thereof; and styrenes.

The polymerization may also be carried out in the presence of from 0.01 to 5% by weight, calculated on the monomers, of one or more emulsifiers. Suitable emulsifiers, which may be anionic, amphoteric, cationic, or non-ionic are, for example, alkali and alkaline earth metal and ammonium salts of fatty acids, for example of lauric, palmitic or stearic acid, of acid fatty alcohol sulfuric acid esters, paraffin sulfonic acids, alkylaryl sulfonic acids such as dodecylbenzene or dibutyl-naphthalene sulfonic acid, of sulfo-succinic acid dialkyl esters, as well as the alkali metal and ammonium salts of fatty acids containing epoxide groups, such as epoxy-stearic acid, or reaction products of per-acids, for example per-acetic acid with unsaturated fatty acids such as oleic acid or linoic acid, or unsaturated hydroxyl derivatives of fatty acids such as ricinoleic acid. Suitable amphoteric or cationic emulsifiers are, for example, alkyl betains, such as dodecyl betain, as well as alkyl pyridinium salts such as lauryl pyridinium hydrochloride; and alkyl ammonium salts such as oxethyl dodecyl ammonium chloride. Suitable non-ionic emulsifiers are, for example, partial fatty acid esters of polyhydric alcohols such as glycerol monostearate, sorbitol monostearate, sorbitol monolaurate, oleate, or palmitate, polyhydroxy ethylene ethers of fatty alcohols or aromatic hydroxy compounds, polyethylene esters of fatty acids and polypropylene oxide-polyethylene oxide condensation products.

Besides the catalysts, protective colloids and optionally emulsifiers, the polymerization may also contain 0.1 to 1% by weight, calculated on monomers, of polymerization auxiliaries such as buffer substances, for example alkali metal acetates, borax, alkali metal phosphates, alkali metal carbonates, ammonia, or ammonium salts of carboxylic acids; and molecular weight regulators, for example aliphatic aldehydes having from 2 to 4 carbon atoms, chlorohydrocarbons, for example di- and trichloroethylene, chloroform, and methylene chloride, mercaptans and propane.

For copolymerization with vinyl chloride, the following monomers can be used; olefins such as ethylene or propylene; vinyl esters of linear or branched carboxylic acids having from 2 to 20 carbon atoms, preferably 2 to 4 carbon atoms, for example vinyl acetate, propionate, butyrate and 2-ethylhexoate; vinyl-isotridecanoic acid esters; vinyl halides, for example vinyl fluoride, vinylidene fluoride, vinylidene chloride; vinyl ethers; vinyl pyridine; unsaturated acids such as maleic, fumaric, acrylic, and methacrylic acid and the mono and diesters thereof with mono- and di-alcohols having from 1 to 10 carbon atoms; acrylonitrile; styrene and N-substituted maleic imides. The copolymerization can also be carried out with monomer mixtures.

For graft polymerization, elastomeric polymers can be used, which are obtained by polymerizing one or more of the following monomers: dienes, for example butadiene and cyclopentadiene; olefins such as ethylene and propylene; styrene; unsaturated acids such as acrylic and methacrylic acids and the esters thereof with mono- and dialcohols having from 1 to 10 carbon atoms; acrylonitrile; vinyl compounds, for example vinyl esters of linear and branched carboxylic acids having from 2 to 20 and preferably from 2 to 4 carbon atoms; and vinyl halides such as vinyl chloride and vinylidene chloride.

Suitable processes and polymerization auxiliaries for making the vinyl chloride suspension polymers to be used are described, for example In "Polyvinylchlorid und Vinylchlorid-Mischpolymerisate" by H. Kainer, Springer Verlag, Berlin/Heidelberg/New York, 1965, pages 12 - 34.

After polymerization further substances can be added to the polymers obtained in aqueous suspension for stabilization and improving their processing properties.

The vinyl chloride polymers obtained after the treatment according to the invention have a residual content of monomeric vinyl chloride of less than 0.005% by weight, or 50 ppm by weight, calculated on the dry polymer, found by gas chromatographic analysis. The process can be carried out under such conditions that after the steam treatment the moist polymer contains less than 0.0035% by weight vinyl chloride, calculated on dry polymer. By the subsequent drying the content of monomeric vinyl chloride is further reduced so that generally polymers containing less than 0.001% by weight, or 10 ppm by weight, of vinyl chloride, calculated on dry polymer, can be obtained, while the air used for drying only contains minimum amounts of vinyl chloride which are far below the emission limits discussed at present by the authorities.

In the treatment of the invention a small amount of steam is consumed. Surprisingly low contents of residual vinyl chloride can already be obtained when 7% by weight, calculated on moist product, of steam are used for treating a moist polymer heated to at least 90° C. The process can be carried out without considerable constructional alterations and without special space required in the usual processing after the suspension polymerization of vinyl chloride with substantial use of existing apparatus. The treatment of the invention takes little time, permits continuous operation with high throughput and it is little liable to local superheating with thermal damage of the polymer.

Especially good results are obtained when vinyl chloride homopolymers are to be freed from monomeric vinyl chloride, especially polymers having porous and relatively coarse particles, characterized by the plasticizer absorption, and polymers produced with a relatively high amount, for example above 0.5% by weight, calculated on monomer used, of suspension auxiliaries.

The vinyl chloride polymers prepared by the process of the invention can be used and further processed in the same manner as usual products with the advantage that the known dificulties caused by degassing monomeric vinyl chloride do not occur.

The steam treatment is preferably carried out in an apparatus according to the invention and consisting of a horizontal vessel in the shape of a cylinder or truncated cone which is closed at the top and open at the bottom, which vessel is provided in its upper part with at least one inlet for the supply of solids and the lower opening of which is closed by a round horizontal disk rotating about its center and having a larger radius than the lower opening of the said vessel, said disk being mounted in such a manner that an annular clearance with adjustable height remains between the disk and the lower edge of the vessel, the center of rotation of the disk preferably being congruent with the axis of the vessel, the border zone of the upper surface of the said disk being in sliding contact with a stationary ring interrupted at one point, stationary or possibly displaceable mechanical means being optionally mounted on the upper surface of the disk and/or in the lower part of the vessel, which means move the material when the disk is in rotating movement and convey it towards the wall of the vessel, the lower part of the apparatus being provided with means to blow in gaseous substances as uniformly as possible over the cross sectional area of the vessel and the upper parts of the vessel having at least one outlet for gaseous substances.

In the following description the term "gaseous substances", which also includes vapors and especially steam, is replaced by the short term "gases".

According to another embodiment of the apparatus of the invention the rotatable disk is mounted in such a manner that it slides over the entire circumference of the bottom edge of the vessel, in the bottom part of the vessel the lateral wall is provided with a horizontal slit adjustable in size from one edge of which slit a baffle plate protrudes into the vessel against the direction of rotation of the disk at an adjustable angle with respect to the radius of the vessel and the lower edge of the baffle plate is in sliding contact with the said disk.

The vessel has the shape of a cylinder or truncated cone, the ratio of the base area to the height being preferably in the range of from 1:1 to 1:5, more preferably 1:2 to 1:3. The ratio of the lower to the upper surface area of the truncated cone can vary between about 4:1 to 1:2, preferably about 3:2 to 9:8.

The inlet for the solid is suitably positioned in the center of the upper surface of the vessel in order to ensure a uniform supply over the entire cross sectional area of the vessel. The inlet can be closed by a nonreturn valve or a similar device. The outlet for the gases is generally arranged also on the upper surface of the vessel, but according to the layout of the apparatus, the inlet and outlet may be disposed in any other area in the upper part of the vessel.

The walls of the vessel are preferably insulated against the loss of heat. They are advantageously provided with heating means so that during the steam treatment of the moist polymer heat may be supplied from the outside. In this manner a condensation of steam and an increase of the water content of the polymer, which may involve conveying problems, are avoided. The wall of the vessel can be heated, for example by a jacket, by surrounding pipes with circulation of a heating agent, or by electric heating elements.

The rotatable disk should preferably extend beyond the lower circumference of the vessel to such an extent that the area covered by the vessel and the free surface of the disk are approximately of equal size, but the ratio of the inner to the outer surface may also be chosen in the range of about 5:1 to 1:2.

The axis of rotation of the disk preferably coincides with the axis of the vessel, or it may be in parallel position with respect to the latter axis at a certain distance therefrom.

The height of the annular clearance between the disk and the lower edge of the vessel is preferably equal to $\frac{1}{4}$ to 1/20 of the lower diameter of the vessel.

The height of the clearance can be varied, for example by lifting or lowering the disk or preferably by a height-adjustable annular sleeve round the lower part of the vessel.

The border zone of the upper surface of the rotatable disk is in sliding contact with a stationary ring preferably having a vertical wall the height of which is advantageously at least equal to the utmost height of the annular clearance between disk and vessel. In general, the height of the ring wall is equal to about 1.2 to 2.5 times the largest height of the clearance.

The ring is interrupted at one point to discharge the material lying on the disk. For this purpose at one edge of the ring opening a vertical baffle plate is disposed against the direction of rotation of the disk and towards the wall of the vessel with adjustable angle relative to the disk radius in such a manner that the disk slides over the lower edge of the baffle plate.

The vessel and the rotatable disk may be provided with stationary mechanical means moving the material in the vessel when the disk rotates and conveying it towards the wall of the vessel. The stationary means may be in adjustable position in order to ensure an optimum movement of the material.

Means of this type are, for example, vertical short baffle plates on the disk; a cone-shaped rotating body on the disk the axis of which coincides with the axis of rotation of the disk, the outer surface of the rotating body being plane or curved, preferably concave, and possibly carrying also baffle plates; one or several wall scrapers firmly mounted on the disk which scrape along the inner wall of the vessel when the disk rotates; a curved baffle plate firmly mounted on the axis of the vessel and sliding with its lower edge over the rotating disk.

According to a further embodiment of the device of the invention the disk is stationary and the curved baffle plate is rotatably mounted and conveys the material in the vessel towards the wall when it rotates.

Alternatively, the disk can be firmly mounted and seal the bottom of the vessel. In this case the disk is provided with a concentric discharge opening around which the curved baffle plate rotates in such a manner that the material in the vessel is transported from the wall of the vessel towards the center.

In the latter case the ring outside of the vessel, the baffle plate mounted on said ring, the portion of the disk protruding over the circumference of the vessel and the ananular, height-adjustable sleeve round the lower part of the vessel can be dispensed with.

To blow the gases into the vessel a pipe, preferably several pipes can be used which pass through the wall of the vessel in the lower part thereof and are distributed at equal distances round the circumference of the wall of the vessel. The pipes may extend to the axis of the vessel and in the interior of the vessel they are preferably in radial position. Each pipe has at least one and preferably several lateral or upper outlet openings. Advantageously, the pipe ends in the vessel are bent in upward direction. In this case only the pipe end has a gas outlet or the end is closed and several openings are uniformly distributed round the pipe in the bent section.

It is advantageous to use three to 27 and preferably three to 12 such pipes.

According to a preferred embodiment of the apparatus of the invention the pipes are disposed in at least two levels or rows one above the other, preferably in staggered position.

The lowest row of pipes is preferably in the lower third of the vessel. If several rows of pipes are disposed one above the other, the uppermost row may reach into the upper third of the vessel. According to a preferred embodiment all gas outlets are in the lower half of the vessel. Especially good results are obtained with all gas outlets in the lower third of the vessel.

According to a further preferred embodiment of the apparatus of the invention the stationary and optionally adjustable mechanical means mounted in the vessel are partially hollow and have outlet openings for the gas. The gas is supplied from the outside by a pipe connection. In the essentially horizontal means the outlet openings are preferably disposed at equal distances from one another. Additionally essentially vertical hollow means may serve to blow gas into the vessel.

According to a further preferred embodiment of the apparatus of the invention the axis of rotation of the disk, parts of the disk and optionally further elements mounted on the disk are hollow and provided, with the exception of the axis, with gas outlets, the gas being supplied through the hollow axis. The disk is provided with outlet openings only in the area covered by the vessel. The gas outlet openings are preferably disposed on a cone-shaped rotating body positioned in the center of the disk.

According to a further preferred embodiment the scraper(s) scraping along the wall of the vessel and disposed on the disk is or are hollow and has or have gas outlet openings, the gas being supplied through pipes in or on the disk and the hollow axis of rotation.

The different means for the introduction of gas may be combined, for example the lateral pipes with the cone-shaped rotating body with outlet openings on the disk or a scraper with gas outlet with a stationary vertical element disposed in the center of the vessel.

The rotatable disk and the adjacent apparatus parts such as the lower portion of the vessel and the ring sealing the disk with respect to the outside are preferably surrounded by a sealing jacket having at least one opening to suck off gases and at least one discharge opening for solids.

The apparatus according to the invention is especially suitable for removing monomeric vinyl chloride from water-containing vinyl chloride homopolymers, copolymers and graft polymers produced by the suspension process with the use of oil-soluble catalysts.

In a continuous operation over several days and with an average residence time of the moist polymer in the treating zone of 5 to 20 minutes the content of residual monomer in the moist polymer could be reduced to 6 – 18 ppm, calculated on dry polymer.

The apparatus is sturdy and little liable to trouble, the prime costs are low. It is preferably installed in the working up of suspension polyvinyl chloride between the decantation and the drying. The steam consumption for the monomer removal is low.

To carry out the steam treatment according to the invention, besides the apparatus described above, other devices may be used, for example conveying or feeding screws, vessels with round cross section with rotating scrapers sliding along the inner wall, fluidized bed driers with and without stirrer, flying bed driers or rotary driers, but with the use of these driers the following disadvantages are observed:

Deposits and incrustations are formed on apparatus parts, which necessitate frequent time-consuming cleaning operations, conveying difficulties occur of too high a moisture content of the polymer and insufficient disintegration thereof. Consequently, the polymer is not uniformly treated with steam and degassing is poor, the residence times are too long and the product may be thermally damaged (caking). The required longer treatment times reduce the capacity of the apparatus, increase the steam consumption and the costs for apparatus.

When the admission of foreign gas cannot be avoided to a sufficient extent, for example in a fluidized bed drier, the issuing mixture of steam and monomers is highly diluted with said gas and the isolation of the monomer necessitates considerable expenditure. Blowing into the atmosphere must be avoided for reasons of environmental protection.

Some apparatus, for example flying bed driers, only permit very short contact times of the steam with the moist polymer so that the removal of residual monomer is insufficient.

The apparatus of the invention can be used, not only for the removal of monomeric vinyl chloride from moist suspension polymers, but also for the gas or steam treatment of other relatively fine grained solid or semisolid substances, especially those having poor or no flow properties at all.

The apparatus according to the invention will now be described by way of example with reference to the accompanying drawings in which like numerals indicate like elements.

In the drawings

Figure 1:
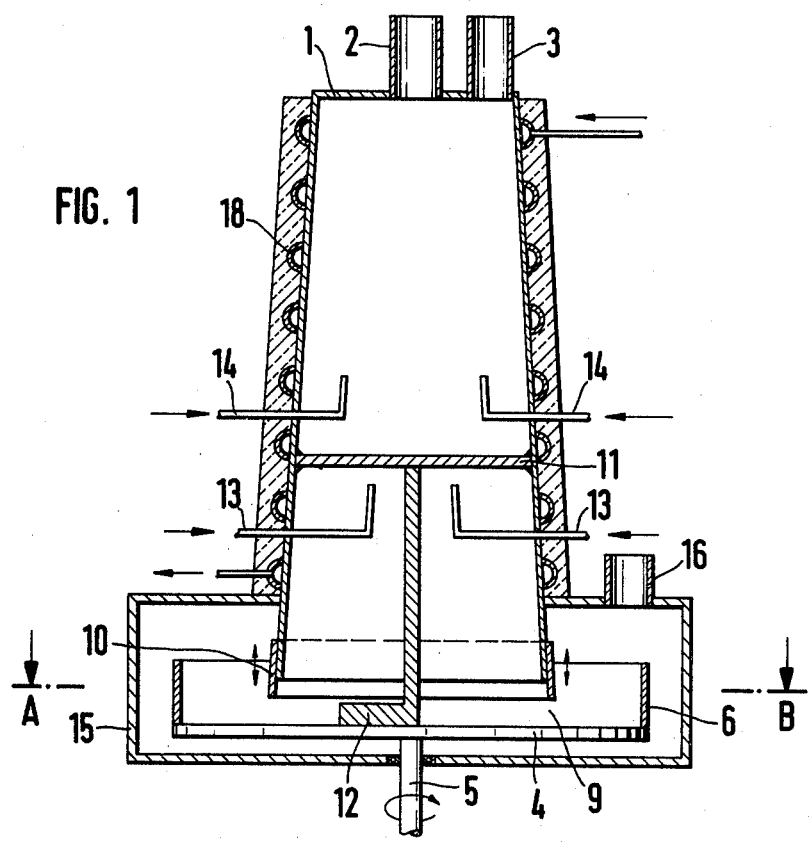
FIG. 1 is longitudinal section of an apparatus of the invention.
Figure 2:
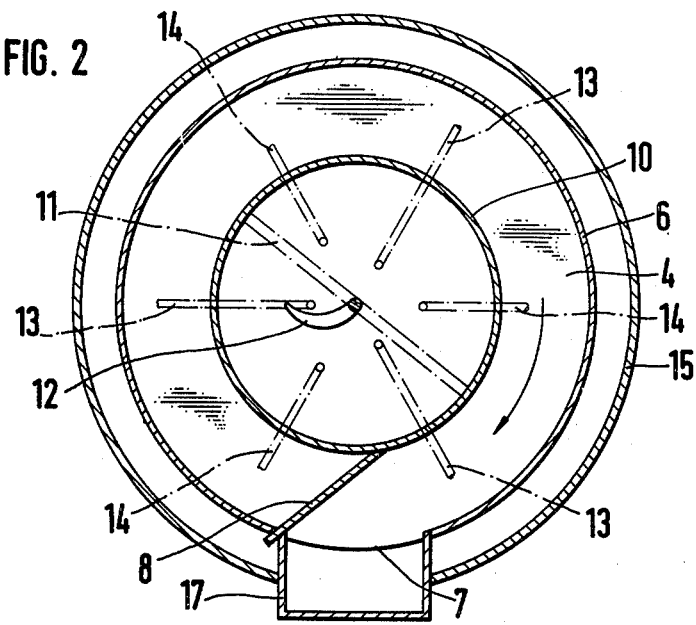
FIG. 2 is a cross sectional view of the apparatus of FIG. 1 taken along line A - B.

Referring to FIGS. 1 and 2, the apparatus consists of a vessel 1 having the shape of a truncated cone and being open at the lower end. The inlet 2 for the moist polymer is positioned in the center of the top surface and beside said inlet the outlet 3 for gaseous substances is mounted. Below the vessel a rotatable disk 4 is installed, the axis of rotation 5 of which coincides with the axis of the vessel. The border zone of the upper surface of the disk touches a vertical ring 6 which is open at 7. A baffle plate 8 extends from one edge of the ring opening towards the wall of the vessel tangentially against the direction of rotation of the disk. An annular clearance 9 remains between the disk and the lower edge of the vessel the height of which clearance can be varied by a sleeve 10 with adjustable height. In the vessel a stationary element 11 is mounted carrying a bent baffle plate 12 at the lower end in radial position. When the disk rotates the lower edge of the baffle plate is in sliding contact with the upper surface of the disk. No elements are mounted on the disk.

In the lower portion of the vessel gas inlets 13 and 14 are passed through the wall. In the vessel the ends of the inlet pipes are bent upwardly in the direction of the axis of the vessel. Each inlet has one gas outlet opening. The pipes are arranged in two levels and each time three of them are uniformly distributed over the circumference in such a manner that the inlet pipes of the upper row 14 are positioned in the interspaces between the inlet pipes of the lower row 13. The disk and the lower portion of the apparatus are provided with a jacket 15 provided with an outlet opening 16 for gaseous substances and an outlet 17 for solids. The wall of the vessel is insulated against heat losses and surrounded by coils of semicircular cross section 18 containing a heatable medium.

When the apparatus is in operation the moist polymer is fed through opening 2 into heated vessel 1. During feeding steam is blown in through pipes 13 and 14 and withdrawn through opening 3. When about ¾ of the vessel are filled rotation of disk 4 is started and sleeve 10 is lifted. Conveyed by baffle plate 12 the product flows on the disk towards the outer edge and is discharged with the aid of baffle plate 8 through ring opening 7 and jacket opening 17. the polymer feed, the height of the sleeve, the number of rotations of the disk and optionally the angle of baffle plate 8 are adjusted in such a manner that the moist polymer is contacted with steam in the vessel for the desired period of time. The gas from the space within the jacket is continuously sucked off through outlet 16.

The discharged moist polymer substantially freed from residual monomer is transferred to a drier.

Figure 3:
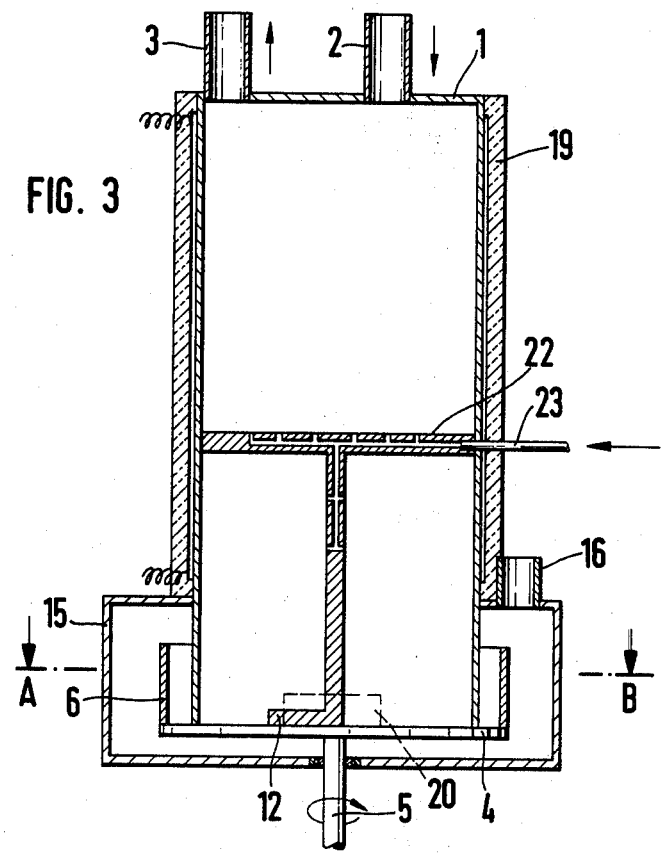
FIG. 3 is a longitudinal section of another form of the apparatus of the invention.
Figure 4:
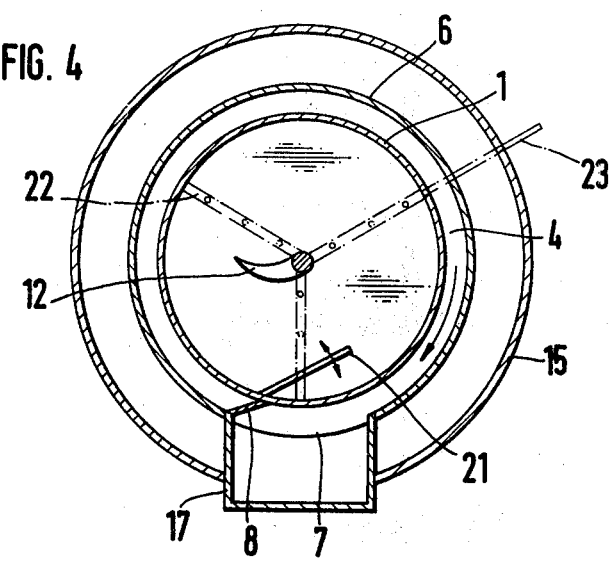
FIG. 4 is a cross sectional view along line A - B of the apparatus shown in FIG. 3.

Referring to FIGS. 3 and 4, vessel 1 has a cylindrical shape and product inlet 2 and gas outlet 3 are positioned on the top surface of the cylinder. The wall of the cylinder is electrically heated and is insulated against heat dissipation by an insulation 19. The upper surface of rotatable disk 4 slides over the lower edge of vessel 1. The lower portion of the vessel has a vertical slit 20 from the edge of which a baffle plate 21 with adjustable angle projects into the vessel. The stationary element 22 in vessel 1 is partially hollow and provided with gas outlet openings. Gas is supplied from the outside through pipe 23. As to the remaining numerals reference is made to the description of FIGS. 1 and 2.

Figure 5:
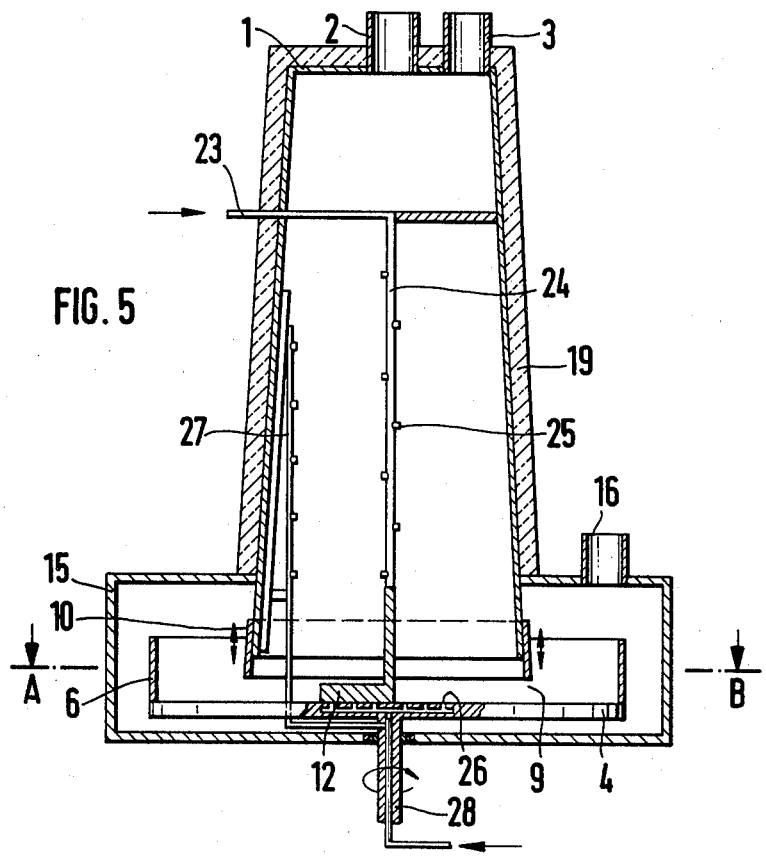
FIG. 5 is a longitudinal section of another form of the apparatus of the invention.
Figure 6:
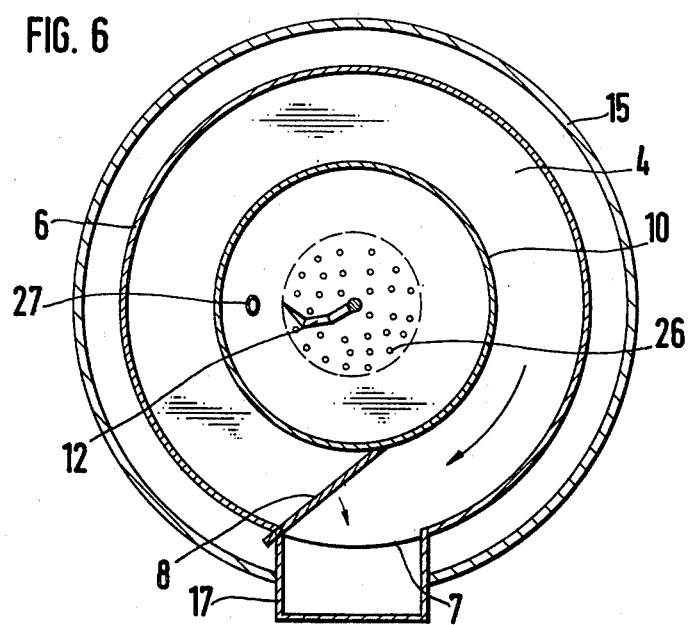
FIG. 6 is a cross sectional view along line A - B of the apparatus shown in FIG. 5.

Referring to FIGS. 5 and 6, different from FIGS. 1 and 2 vessel 1 has only one horizontal gas inlet 23 through which gas is supplied to the hollow stationary and vertical element 24 with uniformly distributed outlet openings 25. The center area of disk 4 is hollow and has outlet openings 26. A hollow scraper 27 provided with outlet openings and scraping along the wall of the vessel is mounted on the disk. The gas for the disk and the scraper is supplied through the hollow disk axis 28. For the other numerals reference is made to the description of FIGS. 1 and 2.

Figure 7:
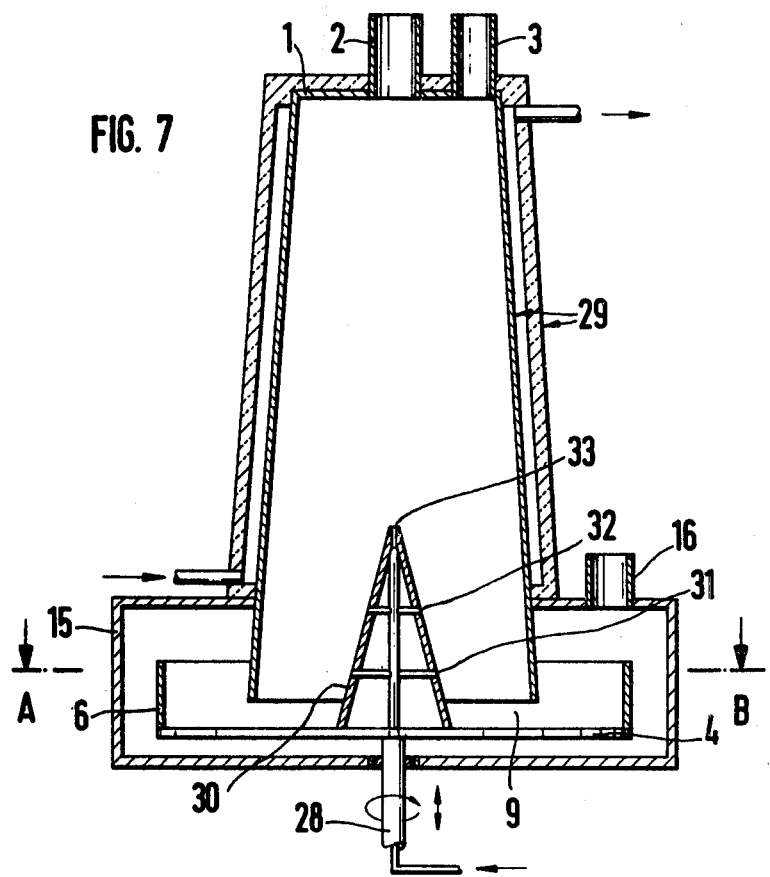
FIG. 7 is a longitudinal section of another form of the apparatus of the invention and FIG. 8 is a cross sectional view along line A - B of the apparatus shown in FIG. 7.
Figure 8:
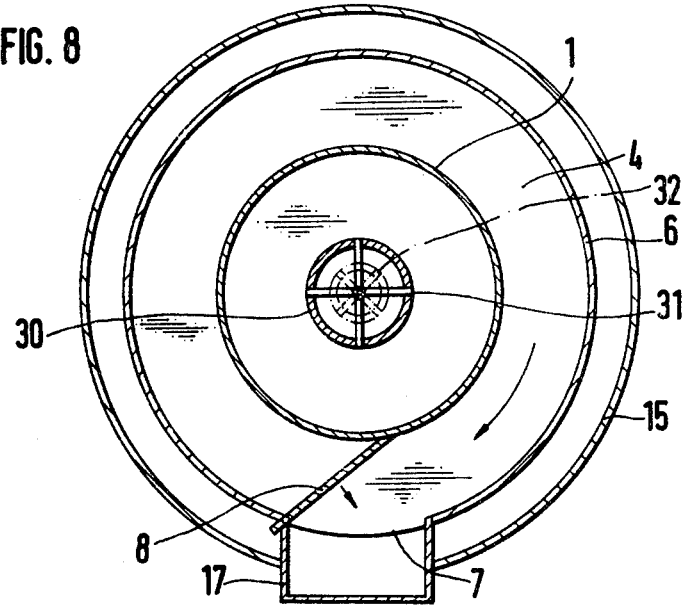

Referring to FIGS. 7 and 8, different from FIGS. 1 and 2 the vessel 1 is surrounded by a heatable jacket 29 and contains no inside elements. Annular clearance 9 can be varied by lifting and lowering disk 4, ring 6 and baffle plate 8. In the center a partially hollow cone 30 is mounted on disk 4, which cone has 8 outlets on two levels in staggered position 31 and 32 and a further gas outlet at the tip of the cone 33. Gas is supplied through hollow axis 28. For the other numerals reference is made to the description of FIGS. 1 and 2.

The following examples illustrate the invention. The indicated measuring values were determined as follows:

Residual vinyl chloride content: by gas chromatography according to the "head-space" method (Zeitschrift fur analytische Chemie 255 (1971) pages 345 - 350).

Average particle size: according to DIN 53 734, evaluation with the granulation screen according to Rosin-Ramler.

Plasticizer absorption: filter papers are placed into two beakers with perforated bottoms in a centrifuge, 2 g polyvinyl chloride are weighed in and 10 ml di(ethylhexyl)-phthalate are poured over the polymer. Possible differences in weight between the two beakers are compensated on a balance with further amounts of di(ethylhexyl)-phthalate. The beakers are centrifuged for 10 minutes at 10,000 revolutions per minute and the increase in weight of the polyvinyl chloride is determined in percent.

The examples and comparative examples 1 to 11 were carried out in an apparatus consisting of a vertical glass cylinder having an internal diameter of about 70 mm, provided with a gas inlet at the bottom and thereabove a horizontal glass frit. The cover of the cylinder had a passage for a stirrer and a gas outlet and the wall of the cylinder was heated by a liquid medium the temperature of which was kept constant and continuously measured.

300 g of the water-containing polymer were introduced into the cylinder, placed on the frit and stirred with a blade stirrer. After heating to about 100° C, steam, previously heated in a heat exchanger to 105° C, was introduced through the lower gas inlet in an amount of 150 g/h. The steam passed through the polymer layer kept in motion and left the cylinder at atmopheric pressure through the upper gas outlet.

Prior to the treatment and at defined constant intervals samples of the polymer were taken and the content of monomeric vinyl chloride was measured gas-chromatographically be the "heat-space" method. In a diagram the values obtained were plotted against the time of treatment and the time necessary for reducing in the polymer the content of monomeric vinyl chloride from 100 ppm to 50 ppm was determined as a measurement of the velocity of monomer removal.

The steam treatment was terminated after 7.5 and 10 minutes, respectively, the polymer was dried for 20 minutes by passing through air heated to 100° C and the dried material was used to determine the K-value, the plasticizer absorption, the average particle size and the residual vinyl chloride content.

The values obtained are indicated in the following table. The following polymers were used:

EXAMPLES 1, 3, 5 AND 7

Vinyl chloride homopolymers prepared by suspension polymerization with oil soluble peroxidic catalyst were used which, after polymerization, had been freed from the major quantity of the aqueous medium by decantation.

COMPARATIVE EXAMPLES 2, 4, 6 AND 8

The same polymers as in Examples 1, 3, 5 and 7 were used with the exception that after decantation they were dried in usual manner in a conveying drier. Each time 225 g of the dry polymer were given into the apparatus described above and heated with steam having a temperature of about 100° C with condensation of water on the polymer, the steam treatment was continued for 7.5 and 10 minutes, respectively, the steam supply was terminated and the product was dried for 20 minutes under reduced pressure with cooling of the polymer to a temperature below its second order transition temperature. During the experiment the wall of the cylinder was substantially protected against heat radiation.

COMPARATIVE EXAMPLE 9

To test the efficiency of monomer removal the polymer of Example 7 was used with the exception that after decantation it was dried as usual in a conveying drier and then mixed with 20% by weight of water, calculated on the dry polymer.

EXAMPLE 10

A suspension copolymer consisting of about 90% by weight (calculated on dry polymer) of vinyl chloride units and about 10% by weight of vinyl acetate units, which had been decanted as described above, was used.

EXAMPLE 11

A suspension copolymer consisting of about 95% by weight (calculated on dry polymer) of vinyl chloride units and about 5% by weight of N-cyclohexyl maleic imide, which had been decanted as described above, was used.

EXAMPLE 12

An apparatus as shown in FIGS. 1 and 2 was used having the following characteristics and dimensions:

height of vessel: 1500 mm
upper diameter of vessel: 500 mm
lower diameter of vessel: 600 mm
diameter of rotating disk: 950 mm
largest height of annular clearance: 85 mm
height of ring: 100 mm Two times three pipes at two levels passed at an angle of 120° with respect to one another into the vessel through the wall, the first level being 250 mm and the second one 650 mm above the lower edge of the vessel. Each pipe projected 100 mm horizontally into the vessel and a further 100 mm of the pipe length were bent vertically in upward direction. The pipe ends were closed but the upward sections were provided with three orifices, each having a diameter of 1.5 mm and being distributed a equal distances over the pipe circumference. The vessel was surrounded by semicircular coils fed with a heating medium and an insulation against heat losses.

420 kg/h of polymer prepared by suspension polymerization of vinyl chloride containing 16.5% by weight, calculated on total mixture, of water and 17,000 ppm, calculated on dry polymer, of monomeric vinyl chloride were fed from above into the apparatus at a temperature of 50° C. By regulating the height of the clearance between the vessel and the disk, the number of rotations of the disk and the angle of the baffle plate fastened at the outer ring, the polymer level in the vessel was maintained constant at 90% of the total volume.

46 kg/h of superheated steam of 3.5 atmospheres gage and 160° C were blown into the vessel through the six pipes. The wall of the vessel was not heated, the semicircular coils were empty. The polymer in the vessel had a temperature of 99° C. At the top of the vessel vinyl chloride containing steam was discharged, condensed and the vinyl chloride was recovered. The steam treatment was carried out at atmospheric pressure, the average residence time of the polymer during the treatment was 14 minutes. 430 kg/h of moist polymer were discharged. The following values were found with a sample:

| | |
|---|---|
| content of monomeric vinyl chloride 10 ppm, calculated on dry polymer | |
| average particle size | 85μ |
| plasticizer absorption | 9% |
| K-value | 55 |

EXAMPLE 13

The apparatus described in Example 12 was charged from above with 850 kg/h of a copolymer, prepared by suspension polymerization of a monomer mixture of 90% by weight of vinyl chloride and 10% by weight of vinyl acetate, the percentages being calculated on the total monomer mixture, which copolymer contained 22% by weight, calculated on the total polymer mixture, of water and 11,000 ppm, calculated on dry polymer, of monomeric vinyl chloride, and had a temperature of 55° C. The wall of the vessel was heated to about 110° C by steam. The height of the clearance, the number of rotations of the disk and the angle of the baffle plate were adjusted in such a manner that the polymer level in the vessel was maintained at 85 to 95% of the total volume of the vessel.

60 kg/h of superheated steam of 3 atmospheres gage and 150° C were blown into the vessel through the six pipes. The polymer in the vessel had a temperature of 100° C, the steam treatment was carried out at atmospheric pressure and the average residence time of the polymer during the steam treatment was 7 minutes. The vinyl chloride containing steam was discharged and worked up as described in Example 12.

860 kg/h of moist polymer were discharged. The following values were found with a sample:

| content of monomeric vinyl chloride 6 ppm, calculated on dry polymer | |
|---|---|
| average particle size | 65μ |
| plasticizer absorption | 8% |
| K-value | 60 |

TABLE

| Ex. No. | H$_2$O % | K-value | average particle size μ | plasticizer absorption % | content of monomeric vinyl chloride (ppm) after starting Product | steam treatment from 100 2.5 | 5 | 7.5 | 10 minutes | ppm 20 min. to 50 ppm (min.) | residual VC after drying under 100° C air | 20 min. reduced pressure |
|---|---|---|---|---|---|---|---|---|---|---|---|---|
| 1 | 27 | 70 | 85 | 29 | 26000 | 8 | 3 | 3 | — | 0.3 | 3 | — |
| 2 | 0.1 | 70 | 85 | 29 | 6270 | 16 | 6 | 4 | — | 0.5 | — | 4 |
| 3 | 19 | 65 | 80 | 13 | 23000 | 14 | 2 | 2 | — | 0.4 | 2 | — |
| 4 | 0.07 | 65 | 80 | 13 | 14000 | 53 | 29 | 11 | — | 1.2 | — | 4 |
| 5 | 21 | 62 | 40 | 11 | 21000 | 52 | 6 | 3 | — | 0.6 | 3 | — |
| 6 | 0.05 | 62 | 40 | 11 | 11000 | 100 | 17 | 5 | — | 1.0 | — | 5 |
| 7 | 19.5 | 55 | 85 | 9 | 16000 | 415 | 130 | — | 31 | 2.2 | 11 | — |
| 8 | 0.05 | 55 | 85 | 9 | 3560 | 315 | 140 | — | 48 | 3.3 | — | 32 |
| 9 | 20 | 55 | 85 | 9 | 4670 | 420 | 175 | — | 64 | 3.7 | 42 | — |
| 10 | 20 | 60 | 65 | 8 | 24000 | 140 | 28 | 10 | — | 1.25 | 5 | — |
| 11 | 23 | 60 | 120 | 11 | 19000 | 93 | 12 | 5 | — | 0.8 | 5 | — |

What is claimed is:

1. In an apparatus for removing a residual monomer from a vinyl chloride polymer containing at least 75% by weight of vinyl chloride units and having a water content of from about 5 to 35% by weight by treatment of the vinyl chloride polymer with steam, the apparatus comprising a truncated conical vessel having a vertical axis and lower to upper surface areas in the range of about 4:1 to about 9:8, the top of the vessel being substantially closed and the bottom being substantially open, at least one outlet in the top for passing gaseous substances through it, at least one inlet in the top for supplying solids, a horizontally disposed turntable disposed adjacent and under the open bottom of the vessel with a space therebetween, the turntable having a peripheral outer wall disposed laterally outside the bottom of the vessel, the turntable having a vertical central axis of rotation being substantially concentric with the vertical axis of the vessel, the peripheral wall of the turntable comprising a stationary ring having at least one opening, a stationary flow-directing vane means mounted in a lower part of the vessel for diverting the material in the lower part of the vessel toward the outer wall of the vessel, the improvement comprising conduit means in the lower part of the apparatus disposed above the turntable for blowing gaseous substances in a substantially uniform pattern through the cross sectional area of the vessel.

2. An apparatus as claimed in claim 1, wherein the flow-directing vane means which diverts the material and conveys it towards the outer wall of the vessel is adjustably mounted.

3. An apparatus as claimed in claim 1, wherein the flow-directing vane means moving the material and conveying it towards the outer wall of the vessel is mounted upon the bottom of the turntable.

4. Apparatus as claimed in claim 1, wherein the turntable includes a rotatable disk in the lower portion of the vessel, a lateral wall of the vessel is provided with a vertical slit adjustable in size, at one edge of the slit the side wall is provided with the flow-directing vane means positioned against the direction of rotation of the disk with an adjustable angle with respect to the radius of the vessel, and the flow-directing vane means having a lower edge which is in sliding contact with the disk.

5. Apparatus as claimed in claim 1, wherein the means to blow in the gaseous substances are pipes passing through the wall of the vessel in at least one level and at equal distances from one another distributed over the circumference of the vessel, which pipes are provided with gas outlets inside of the vessel.

6. Apparatus as claim in claim 5, wherein the peripheral end portions and the end portions of the pipes in the vessel are bent upwardly, the ends are closed and the upwardly disposed portions of the pipes are provided with lateral gas outlets.

7. Apparatus as claimed in claim 5, wherein three to 27 pipes are passed through the wall of the vessel.

8. Apparatus as claimed in claim 5, wherein the means to blow gaseous substances into the vessel are disposed in at least two levels one above the other.

9. Apparatus as claimed in claim 1, wherein the flow-directing vane means moving the material in the vessel are at least partially hollow, have gas outlet openings and are in connection with a gas supply from the outside.

10. Apparatus as claimed in claim 1, wherein the lower portion of the vessel, the rotating turntable and adjacent elements are surrounded by a stationary tight jacket provided with at least one opening to suck off gases and an opening to discharge the treated product.

11. Apparatus as claimed in claim 1, wherein the wall of the vessel is insulated against heat losses and has heating means.

* * * * *